United States Patent [19]

Warszawski et al.

[11] 3,773,559
[45] Nov. 20, 1973

[54] HYDRAULIC TYPE VOLTAGE CONTROL FOR A BATTERY OF SERIES CONNECTED FUEL CELLS

[75] Inventors: Bernard Warszawski, Paris; Bernard Verger, Palaiseau; Paul Domenjoud, Neuilly sur Seine, all of France

[73] Assignee: Societe Generale De Constructions Electriques Et Mecaniques (Alsthom), Paris, France

[22] Filed: Sept. 27, 1971

[21] Appl. No.: 183,769

[30] Foreign Application Priority Data
Sept. 30, 1970 France.....................7035452

[52] U.S. Cl. ............................. 136/86 B
[51] Int. Cl. ................... H01m 27/00, H01m 27/14
[58] Field of Search .................. 136/86; 320/18, 17, 320/57, 59

[56] References Cited
UNITED STATES PATENTS

| | | | |
|---|---|---|---|
| 2,624,033 | 12/1952 | Jacquier................................ | 320/18 |
| 2,925,455 | 2/1960 | Eidensohn et al. ................ | 136/86 A |
| 3,453,147 | 7/1969 | Griffin.............................. | 136/86 E |
| 3,471,337 | 10/1969 | Fetterman......................... | 136/86 B |

Primary Examiner—A. B. Curtis
Assistant Examiner—H. A. Feeley
Attorney—Flynn & Frishauf

[57] ABSTRACT

In a battery of several fuel cells connected in series and supplied with a common recycled electrolyte flow, the first cell 1 is continuously supplied with an adjustable flow of energizing reagent, the adjustment being over a range carrying the voltage across the terminals of the cell between minimum and maximum working value. Each of the other cells (2, 3, 4), which may or may not be supplied with reagent during the use of the battery, is shunted by a rectifier (16, 17, 18) that allows current to pass in the direction of the normal discharge current of the battery as a whole, and the group of cells is supplied with energizing reagent having a total flow subject to adjustment between the flow necessary to obtain the minimum voltage at the terminals of the first cell and that which provides the maximum voltage at the terminals of the battery, this total flow being made up of a variable number of individual cell flows such that at a given moment, ratio between the flow at that moment and the maximum flow is the same for all the cells being energized. This system is particularly applicable to motors for propelling land vehicles.

7 Claims, 2 Drawing Figures

HYDRAULIC TYPE VOLTAGE CONTROL FOR A BATTERY OF SERIES CONNECTED FUEL CELLS

This invention relates to a variable voltage fuel cell battery for the purpose of adapting fuel cells of modern design to the requirements of electric motors for propelling vehicles, particularly land vehicles.

It is known that it is necessary to start up a traction motor at reduced votage. Furthermore, for the comfort of the driver and passengers and for the endurance of the transmission mechanism, it is desirable for the motor current to be capable of variation or adjustment with as little as possible of sudden transitions, so as to obtain a constant torque and hence a smooth accleration.

In order to obtain a satisfactory mode of operation one may consider favorably the arrangement of fuel cells in the form of unit cells connected in series. To apply the output of such an installation to a variable load one might use switching by means of contactors, but in that case each unit cell, sometimes in service and sometimes out of service, would then have to have an independent electrolyte supply cycle.

One may also employ a collection of fuel cells connected in series possessing a common electrolyte recycling system and delivering an electromotive force not subject to adjustment. In that case, for control of power output, it is necessary to rely on a device such as that generally known as a "pulser," the purpose of which is to transform a continuous voltage of constant magnitude into a continuous voltage of variable magnitude. Unfortunately, the pulser is an expensive and cumbersome apparatus which, besides involves a risk of emitting radio frequency interference.

One might likewise consider providing control of the output voltage of an arrangement of several fuel cells connected in series by continuously supplying a first cell with a normal flow of electrolyte and supplying the following cells of the series with a progressively variable flow, ranging between a small amount necessary to assure the continuity of the electric circuit and, on the other hand, the maximum effective flow. Such a device does not operate satisfactorily, for, in particular, the cells that are supplied with a small flow of electrolyte, since the full output current goes through them, set up a substantial counter electromotive force which greatly reduces the output of the combination. Furthermore, below a certain electrolyte flow, the cells operate under very unfavorable conditions.

An object of the present invention is an arrangement providing control of the output voltage, by hydraulic means, of a series combination of several fuel cells having a common circulating electrolyte in which, for the starting of a vehicle, at least the first cell is continuously supplied with energizing reagent with regulation of the electrolyte flow making it possible to obtain at the terminals of the said first cell a voltage in the range between minimum and maximum values compatible with proper operation.

SUBJECT MATTER OF THE PRESENT INVENTION:

Briefly, each of the fuel cells other than the one which is continuously supplied with energizing reagent, is designed to be energized or not during operation according to the propulsion needs of the vehicle and, for that purpose, it shunted by a rectifier which permits the electric current to be passed in the normal direction of flow delivered by the series combination of cells. The battery constituted by the cells is supplied with a controllable total flow of reagent ranging between the amount of flow necessary to provide the minimum working voltage at the terminals of the first cell and the flow capable of providing maximum voltage at the terminals of the series combination of cells. The electrolyte flow in each of the variable number of cells participating therein contributes to the total flow in such a way that at a given moment the ratio of the flow at that moment to the maximum flow is the same for all the cells actively operating. In a system embodying the invention the control of the reagent flow can be made effective either before or after the introduction of the energizing reagent into the electrolyte. In the former case the electrolyte flow is constant whereas in the latter case the flow of electrolyte is variable along with that of the reagent. One may naturally combine both methods of control.

The invention will be described by way of example with reference to the accompanying drawings, wherein.

Figure 1:
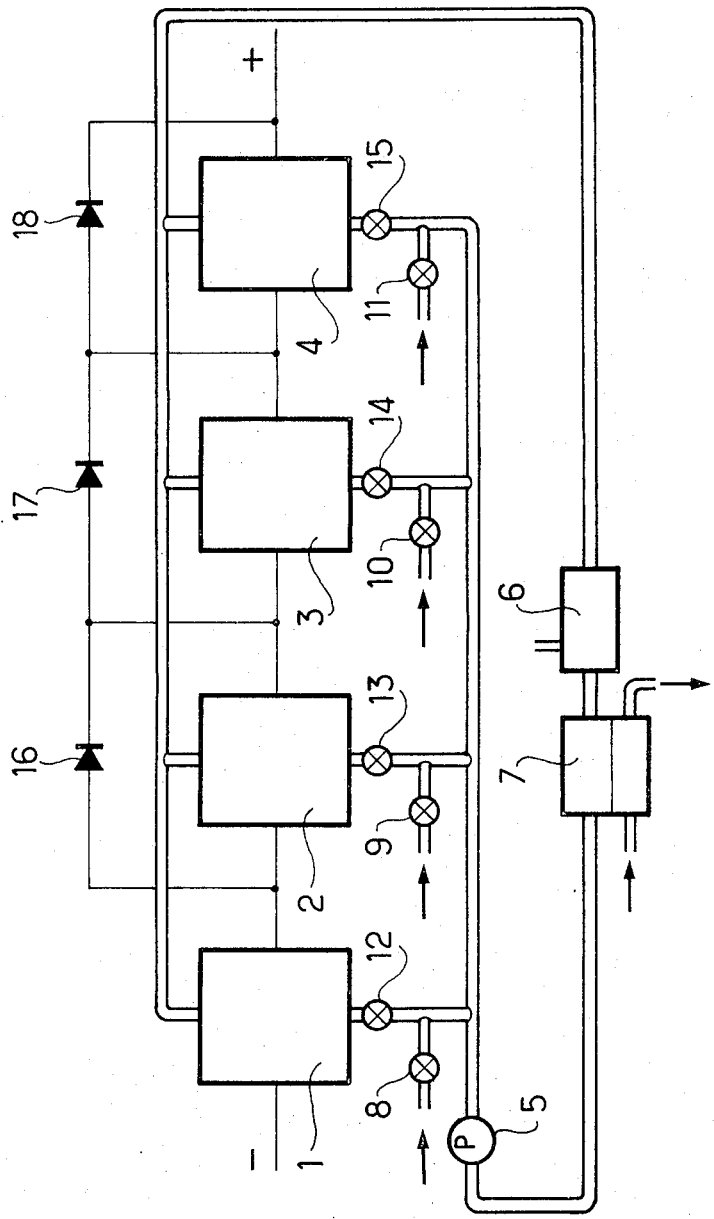
FIG. 1 is a diagram of a system embodying the present invention.

FIG. 1 shows a battery consisting of four fuel cell, 1, 2, 3 and 4 electrically connected in series. These cells are connected to a common electrolyte feed system which may include, for example, a pump 5, a separator 6 and an exchanger 7. The separator 6 serves to remove gaseous products of the reaction. The cells may be supplied with energizing reagent in amounts of flow controllable by means of valves 8, 9, 10 and 11 respectively associated with the cells 1, 2, 3 and 4. The electrolyte recycling flow can be controlled by valves 12, 13, 14 and 15. Cell 1 is continuously supplied with reagent. By operating valve 8 it is possible to obtain at the terminals of cell 1 an electromotive force ranging between maximum and minimum values compatible with useful operation. In accordance with the invention, cells 2, 3 and 4 which are not at all times necessarily supplied with reagent are shunted respectively by rectifiers 16, 17 and 18 that allow electric current to pass in the direction of normal discharge of the battery.

Figure 2:
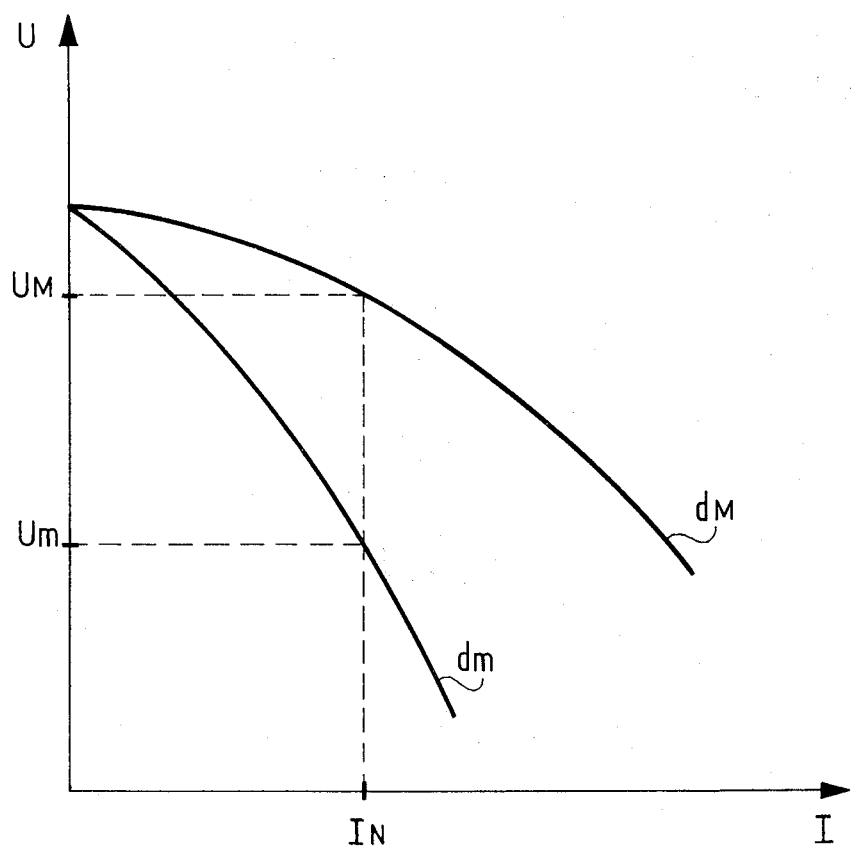
FIG. 2 is a graphical representation of the relation between voltage and current for various amounts of reagent flow in a fuel cell.

The operation of the battery shown in FIG. 1 will now be explained by reference to the graph of FIG. 2 which shows voltage, plotted as the ordinate, as a function of current, plotted at the abscissa. Curves are shown in FIG. 2 corresponding respectively to the minimum flow dm and to the maximum flow dM of the energizing reagent.

With valves 9, 10 and 11 shut, the valve 8 open, and valves 12, 13, 14 and 15 set for identical amounts of flow, the pump 5 is set into operation to put cell 1 into service, this being accomplished when the reagent flow reaches the value dm, which in turn causes the voltage $U_m$ to appear at the terminals of the cell 1 and to provide a normal motor starting current. Assuming that it is desired to preserve the current magnitude $I_N$ constant during starting the reagent flow will be made to increase at first only in cell 1 up to the value dM, whereby the voltage will gradually increase up to the value $U_M$. Cells 2, 3 and 4, not being supplied with reagent, do not give rise to any electromotive force in the same sense as $U_M$, but instead provide resistance to the passage of the current furnished by cell 1, so that this current flows rather through rectifiers 16, 17 and 18.

In order to obtain a voltage greater than $U_M$ at the terminals of the battery, it is necessary for another cell of the series, for example cell 2, which may be assumed to be identical to cell 1, to contribute to the current. Cell 2 cannot usefully operate without a reagent flow at least equal to dm. In order to avoid variations in current at the moment when cell 2 is put into service, it is essential that the voltage at the battery terminals resulting from of the combination constituted by cells 1 and 2 in series should be in the neighborhood of $U_M/2$. In order to obtain this result the two cells must be supplied with identical amounts of reagent flow, providing, for the current $I_N$, a voltage in the neighborhood of $U_M/2$ across the terminals of each cell. This condition can be brought about by the simultaneous adjustment of the opening of valves 8 and 9 at two identical values which depend upon the characteristics of the pump 5. The flow of reagent in the cells 1 and 2 will then be progressively increased up to the maximum dM, for which the voltage across the terminals of the series combination of cells 1 and 2 will be $2U_M$.

The introduction in series of voltages generated by successive cells is carried out following the same procedure. When the $n^{th}$ cell is operatively placed in series, the flow of reagent will be regulated in the range of values providing a voltage across the terminals of each cell in the range between $(n-1)\ ^{U}M/n$ and $^{U}{}_M/n$.

Analagous relations can be worked out in a similar way for cells that are not identical. In this case the amounts of reagent flow are no longer equal for all the cells in service, but at a given moment, the ratio of the flow for each cell at that moment and the maximum flow that it can accept is the same for all of these cells.

In a similar way it is possible to control appropriately the flow of reagent after its introduction in the electrolyte by means of valves 12, 13, 14 and 15, either for identical cells, or for non-identical cells. In this case the reagent intake valves 8, 9, 10 and 11 are closed or completely open according to the range of voltages that it is desired to obtain.

We claim:

1. A system for voltage control of a plurality of fuel cells comprising
    means common to all said cells of the plurality to circulate electrolyte to all said cells;
    means to electrically connect at least one cell in series with all the other cells of said plurality of cells, all said cells being poled alike;
    a rectifier shunting each of said all other cells so poled to pass electric current in the normal direction of discharge of each cell of said all other cells;
    means to control electrolyte flow to said at least one cell to be continuously supplied with energizing reagent, the flow of said reagent being regulated within a flow range so that said at least one cell will have an output voltage betwen a minimum and maximum working voltage thereof;
    and flow control means for regulating the flow of energizing reagent, selectively, through any one of the other cells of said plurality of cells, between (a) shut-off, (b) a minimum amount sufficient so that the respective cell will have a minimum working voltage and (c) a maximum flow so that said respectively controlled cell will have maximum working voltage, to provide for reagent flow through all the cells which have, selectively, at any given instant of time reagent applied thereto, of such magnitude that the ratio of the flow of reagent with respect to the maximum reagent flow in all of the cells which are then being energized with reagent, is the same.

2. A system according to claim 1 in which said flow control means is adapted to effectuate the control of the flow of said reagent at least in part prior to its introduction into said electrolyte.

3. A system, according to claim 2 in which said flow control means is adapted to control the flow of said reagent completely prior to its introduction into said electrolyte and also adapted to maintain constant the flow of said electrolyte.

4. A system according to claim 1 in which said flow control means is adapted to control the flow of said reagent at least in part after its introduction into said electrolyte by variation of the flow of said electrolyte.

5. A voltage controllable fuel cell battery having a plurality of fuel cells electrically connected in series and supplied in parallel with electrolyte from a common recirculation system comprising, in addition to said fuel cells and said electrolyte recirculation system:
    means for admitting energizing reagent to the parallel branches of said electrolyte recirculation system,
    means for controlling the supply of reagent to at least one cell of said battery in amounts such that said at least one cell thereof is continuously supplied, while said battery is in operation, with a flow of reagent at least sufficient for a minimum useful electrical output;
    means for selectively, progressively controlling the supply of reagent to additional cells as the contribution of their electromotive force is required to maintain a desired current, in amounts such that all cells which are being, selectively, simultaneously supplied with reagent at a particular time, shall be fed approximately the same proportion of actual reagent flow with respect to full output reagent flow of the respective cells being supplied with reagent flow, and
    rectifiers respectively shunting each of said cells other than said at least one cell or cells, said rectifiers being so poled as to favor the passage of current in the normal discharge direction for said battery.

6. A method to start electric devices with progressively increasing voltage, supplied by a fuel cell battery including n identical cells having a common recirculated electrolyte supply and individual energizing reagent supplies, including the following steps:
    a first feeding a first cell with reagent at a progressively increasing flow rate until the voltage of said battery reaches a given value $U_M$,
    b then simultaneously feeding a second cell with reagent and decreasing the reagent flow rate of said first cell, in such proportion that both flow rates are equal, until the battery voltage of both cells equals $U_M$,
    c simultaneously increasing the reagent flow rates of both cells, in such proportion that the flow rates remain equal to one another, until the battery voltage reaches $2\ U_M$,
    d then simultaneously feeding a third cell with reagent and decreasing the reagent flow rates of said first and second cells in such proportion that the three flow rates are equal and that the battery voltage of all three cells equals 2 $U_M$, e  increasing the reagent flow rates of said three cells in such proportion that they remain equal to each other until the battery voltage is 3 $U_M$, f  supplying the other cells with reagent, one after the other, in the same manner, until the voltage battery reaches n $U_M$.

7. Method according to claim 6, wherein the device it an electric d-c motor comprising the step of connecting n-1 rectifiers, one each, in parallel with n-1 cells omitting the first cell, and connecting the motor across the battery.

* * * * *